A. B. MASTERS.
MEANS FOR THE COLLECTION OF FARES IN PUBLIC CONVEYANCES.
APPLICATION FILED OCT. 19, 1911.
1,148,979.
Patented Aug. 3, 1915.
3 SHEETS—SHEET 1.
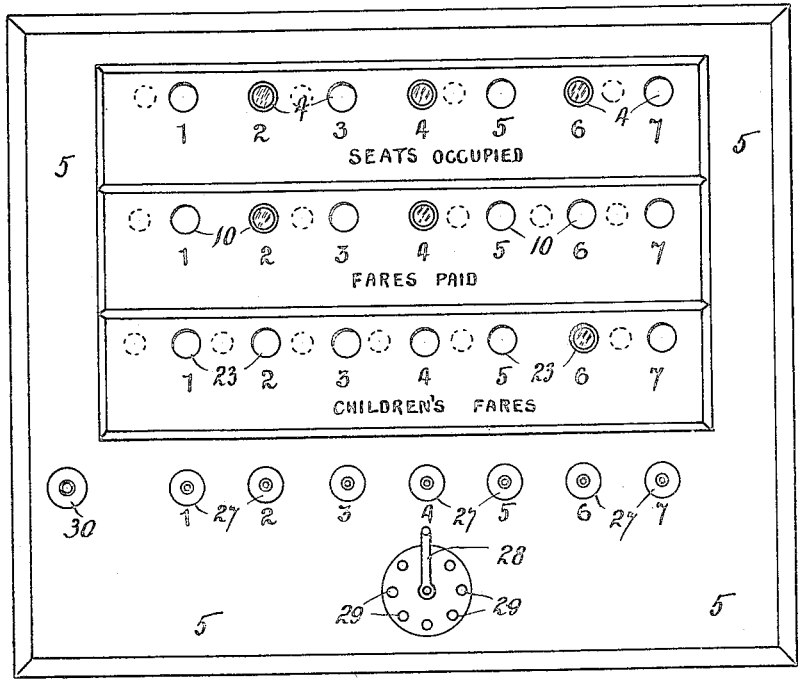
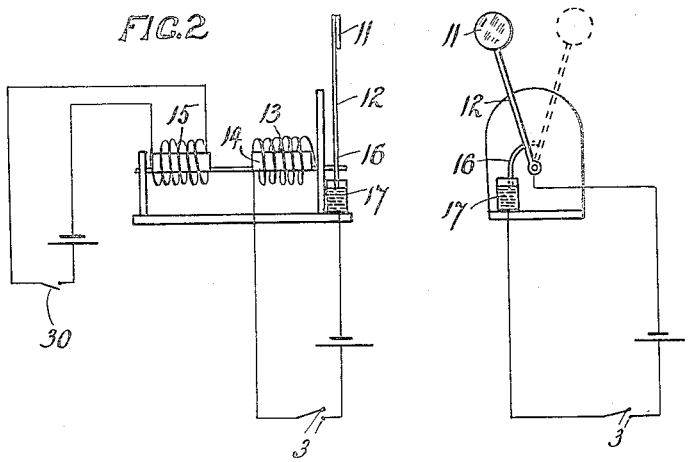
WITNESSES:
INVENTOR,
ARTHUR BROWNING MASTERS
by H. van Oldeneel
Attorney.

A. B. MASTERS.
MEANS FOR THE COLLECTION OF FARES IN PUBLIC CONVEYANCES.
APPLICATION FILED OCT. 19, 1911.
1,148,979.
Patented Aug. 3, 1915.
3 SHEETS—SHEET 2.
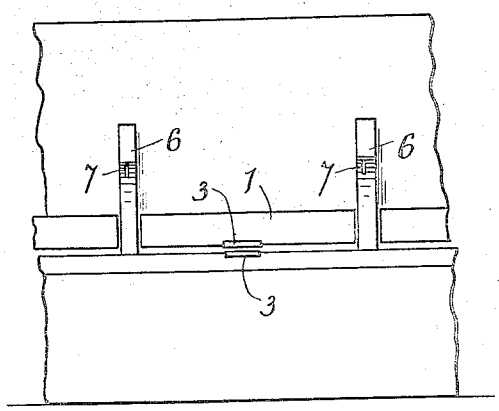
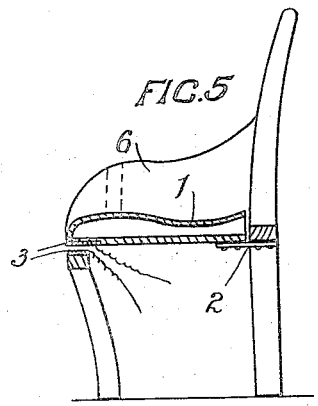
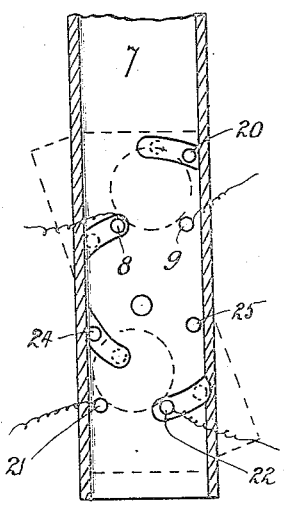
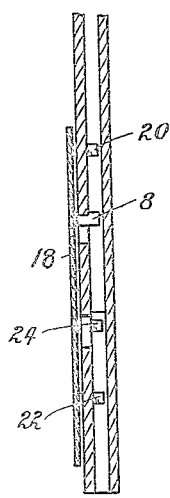
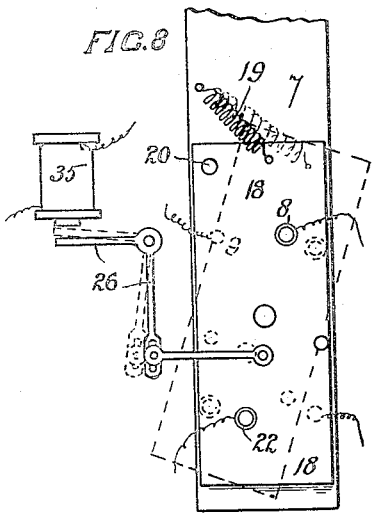
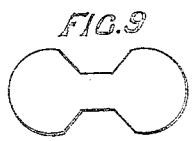
WITNESSES:
INVENTOR,
ARTHUR BROWNING MASTERS
by
Attorney.

A. B. MASTERS.
MEANS FOR THE COLLECTION OF FARES IN PUBLIC CONVEYANCES.
APPLICATION FILED OCT. 19, 1911.

1,148,979.

Patented Aug. 3, 1915.
3 SHEETS—SHEET 3.

WITNESSES:

INVENTOR,
ARTHUR BROWNING MASTERS
by
Attorney.

UNITED STATES PATENT OFFICE.

ARTHUR BROWNING MASTERS, OF CHRISTCHURCH, NEW ZEALAND.

MEANS FOR THE COLLECTION OF FARES IN PUBLIC CONVEYANCES.

1,148,979. Specification of Letters Patent. Patented Aug. 3, 1915.

Application filed October 19, 1911. Serial No. 655,454.

*To all whom it may concern:*

Be it known that I, ARTHUR BROWNING MASTERS, subject of the King of Great Britain, residing at Christchurch, New Zealand, have invented new and useful Improvements in Means for the Collection of Fares in Public Conveyances; and I do hereby declare the following to be a full, clear, and exact description of the same.

This invention has been designed in order to dispense with the usual custom of conductors collecting the fares from passengers in public conveyances and to provide for the fares being paid by each passenger dropping a coin, corresponding in amount with the fare of the section being traveled over, into a coin slot arranged adjacent to the seat upon which he is sitting.

The invention is intended for use in conjunction with any of the electrically actuated indicators to indicate when the different seats in the conveyance are occupied, and consists of indicators which indicate the fact that fares have been paid by the occupants of the respective seats. In conjunction with these indicators are means whereby the whole may be re-set and the coins released from all or any one of the respective fare slots by the operation, by the conductor, of special switches.

The invention may comprise a special indicator for use for indicating the payment of children's, or half fares, by a passenger occupying any particular seat.

It also comprises a special form of coin slot embodying means for the retention of the fare coin or token, upon contact points and for the release thereof by mechanism operated by the conductor.

The invention has been particularly designed for use upon street trolley cars in which section fares are paid by the passengers, although it may be used in other systems.

In fully describing the invention reference will be made to the accompanying drawings, in which:—

Figure 10:
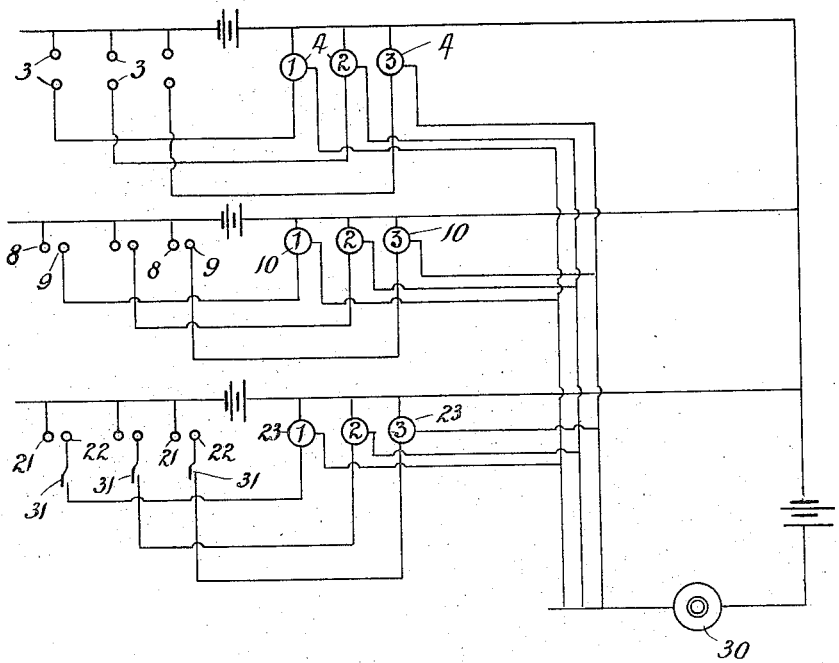
Figure 11:
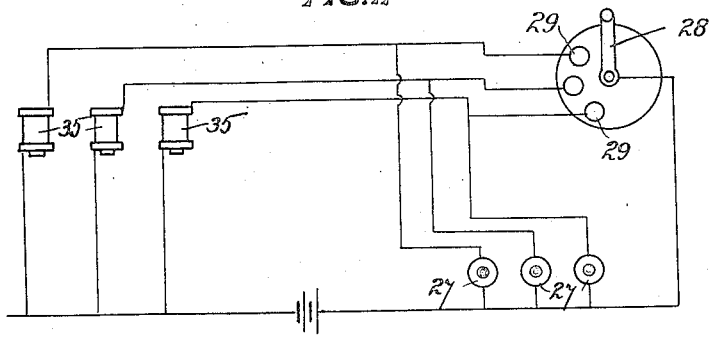

Figure 1 is a front view illustrating the arrangement of the indicators and the conductor's re-set switches as designed for a car containing seven seats. Fig. 2 is a side elevation, and Fig. 3 a front elevation of a special form of indicator adapted for use in this invention. Fig. 4 is a front elevation, and Fig. 5 a sectional side elevation showing the construction and arrangement of seats. Fig. 6 is a front section of the coin slot constructed according to this invention. Fig. 7 is a cross section thereof. Fig. 8 is a back elevation, together with the means for releasing the coins therefrom. Fig. 9 is a view of a special form of token for use instead of coins. Fig. 10 is a diagram illustrating the arrangement of the indicator circuits. Fig. 11 is a diagram illustrating the arrangement of the coin releasing circuits.

In carrying out the invention each passenger's seat (1) (Figs. 4 and 5) is preferably made separate from the others and is spring hinged at (2) so as to be capable of dropping a slight distance when sat on. The spring hinge will retain the seat in the elevated position shown in Fig. 5 when unoccupied. A pair of electric contacts (3) are arranged in the seat and seat frame and so adjusted as to be brought into close engagement with one another when the seat is depressed. These contacts are arranged in electric circuit with an indicator (4) arranged upon an indicator board (5) at one end of the car, a separate indicator being provided for each seat. Thus when a seat is occupied its indicator (4) will be actuated so that the conductor may ascertain the fact by looking at the indicators. Within the arm rest (6) of each seat is fixed the coin slot (7) (Figs. 6–8). This slot is made to receive the coin corresponding to the section fare and is provided with a pair of contact pins (8–9) that lie normally in the course of the coin's passage through the slot so that when a coin is dropped into it, a metallic connection between the pins will be made. These contact pins are arranged in electric circuit with an indicator (10) upon the indicator board (5) and a separate indicator is provided for each seat. A passenger thus occupying a seat will first cause the corresponding indicator (4) to be actuated, and then on dropping his fare into his fare slot (7) will cause the corresponding fare indicator (10) to be actuated. Thus a conductor upon inspecting the indicators may ascertain what seats are occupied and what passengers have paid the fares for the section.

The form of indicators employed may be of any desired and well known make, but preferably such as will, after being actuated, break the circuit, and remain in the indicative position. A suitable form is shown in Figs. 2 and 3 in which the disk 11 is mounted on the pivoted arm 12 and such arm is caused to rock in one direction by sending a current through a coil 13 surrounding a core plate 14 fixed to the arm pivot, and to rock in a reverse direction by sending a reverse current through a second coil 15 surrounding the core plate. Attached to the arm 12 is a bent rod 16 that dips into a mercury cup 17 when the arm is across in the position to hide the disk 11. This mercury cup and the arm are arranged in the circuit with the seat contacts 3 (or the coin contacts 8—9) and the coil 13, so that upon such contacts being bridged the circuit will be completed, causing the arm 12 to swing across. As it passes the center of its movement the rod 16 will emerge from the mercury in the cup 17 and break the circuit, while the arm and disk will then fall through the rest of their movement by their own weight. The reverse movement of the arm will remake the circuit with the exception of the contacts.

It is not desired to confine the invention to this form of indicator as others having similar properties may be employed, for instance, a flag actuated by a polarized relay in the well known way. What is specially desired is to break the circuit after each indicator has been actuated so as to prevent any waste of electric current or battery power.

The means for releasing the coins from the fare slots 7 are shown in Figs. 6 to 8. The slot is provided with a plate 18 pivoted on its back face and adapted to rock to and fro across such face. One of the fare indicator contacts 8 is fixed to this plate and projects inward through an opening across the slot so as, with the contact 9 projecting from the back of the slot, to form a rest for the coin. The plate 18 is retained in the position such as to cause the contact pins 8 and 9 to lie in the passage of the coin, by means of a suitable spring 19 (Fig. 8). When the plate is rocked the pin 8 is caused to travel away from the pin 9 a sufficient distance to permit of the coin dropping down the slot. At the same time a pin 20 fixed to the plate 18 and projecting into the slot above the contact pins 8 and 9, is caused to pass in from the edge of the slot above the coin and occupy a central position so as to prevent a second coin passing down between the contacts until the plate moves back to its original position. Within the slot, a second pair of contact pins 21 and 22 similar in arrangement and working to the contacts 8 and 9 may be arranged to catch the coin after it has been released from such contacts 8 and 9. These second contacts are arranged in circuit with a second indicator 23 upon the indicator board (5) in a manner and for a purpose to be hereinafter described. Before dropping on to these contact pins 21 and 22, the coin will be caught by pins 24 and 25 one of which is fixed to the plate 18 so that when the pins 8 and 9 open to release the coin these pins 24 and 25 will close to hold it, and on the return movement of the plate, the pins 8 and 9 will close to receive a fresh coin and the pins 24 and 25 will open to permit of the coin released from the pins 8 and 9 falling on to the contacts 21 and 22. Then upon the next movement of the plate 18 these last pins will open and permit the coin to drop through the slot into a receptacle placed beneath the seat to receive it.

The plate 18 is adapted to be rocked in the manner described by means of an electro-magnet 35 (Fig. 8) adapted when energized to attract one arm of a bell crank lever 26, the other arm of which is fastened to the plate.

The plate of each coin slot is adapted to actuate separately from those of all the others by arranging its magnet in electric circuit with an ordinary and separate push switch 27 upon the indicator board 5 so that the conductor may, at will release the fare from any passenger's seat. The whole of the plates are, however, adapted to be actuated by a single operation by causing a switch lever 28 (Figs. 1 and 11) to pass over a ring of contacts 29, each one of which is arranged in the circuit of one of the plate actuating circuits, while the lever itself is connected to the other pole of such circuits. The arrangement of the circuits and battery for attaining these objects are clearly shown in Fig. 11 where a series of three points are provided for.

The whole of the two series of indicators 4 and 10 are adapted to be re-set by arranging their reverse coils 15 in electric circuit with a push switch 30 upon the indicator board 5. These may be arranged in parallel as shown by the diagram in Fig. 10, or if desired may be arranged in series circuit according to the requirements of the case.

In use, at the end of a section, the conductor will actuate the switch lever 28 to operate all of the coin slots and release the coins from the contacts 8 and 9, and will also actuate the switch 30 to re-set the whole of the indicators 4 and 10. Then should any seats be still occupied, or should a second coin have been inserted in the slot of any seat, the corresponding indicators will be again actuated, but should the fare for the next section not have been paid for any occupied seat the corresponding indicators will show that the seat is occupied and the fare unpaid.

Should a passenger leave a seat at a point before the section end, the conductor will release the fare from the slot of such seat by actuating the push switch 27 corresponding thereto. He will then operate the push switch 30 to re-set all the indicators 4 and 10 when those still occupied and for which the fares have been paid and remain in the slots will be again actuated without any necessity of further action on the part of the passengers or conductor.

In systems where children are permitted to travel over two or more sections at the adult fare for one section, the coin slot of each seat is connected up with one of the indicators 23 before described, through the medium of the electric circuit in which the contact pins 21 and 22 are arranged. This circuit is however, an open one, so that when the seat is occupied by an adult and the coin drops on to the contact pins, after being released from the contacts 8 and 9, the indicator 23 will not be actuated. A switch 31 (Fig. 10) is however arranged in the circuit and preferably situated above or adjacent to the seat so that the conductor on noting that a child is occupying a particular seat may actuate such switch and close the circuit in order to operate the corresponding indicator 23 and thus notify that a child's fare has been paid for that seat. The several indicators 23 are arranged in circuit with the common re-set switch 30 so that they too will be re-set at the end of each section.

In systems where concession tickets are granted and a fare paid by the cancellation of the whole or part of such ticket, the conductor on collecting the ticket will drop a metallic token, of suitable size, into the fare slot. Where a fare for two sections is thus paid, the token may be of the form shown in Fig. 9 so that one end will fall through between the contacts 8 and 9 and then the other end be caught when the coin releasing mechanism is actuated.

A passenger wishing to travel over two or more sections may drop an equivalent number of coins into the slot, one above the other, when such coins will make connection between the contacts 8 and 9 in turn, as the one next below it is released at the section ends.

The diagram of the wiring shown in Figs. 10 and 11 is arranged for three seats, but it will be readily understood that, as the parts are the same for each seat, any desired number may be similarly connected up. In like manner the indicators and switches for the seven seats shown in Fig. 1 may be repeated any number of times to meet the seating capacity of any conveyance.

What I do claim as my invention and desire to secure by Letters Patent is:—

1. In means for collecting fares, the combination of a plurality of seats; devices associated with the seats respectively and each provided with a slot adapted to receive a metallic fare or token, contact points in each slot against which said fare or token may be held; an indicator corresponding to each of said devices; conductors connecting each indicator in an electric circuit with the contact points of the corresponding device; means for releasing the tokens from any of the slots; and means for resetting all of the indicators.

2. In means for collecting fares, the combination of a plurality of devices each provided with a slot adapted to receive a metallic fare or token, contact points in each slot against which said fare or token may be held; an indicator corresponding to each of said devices; conductors connecting each indicator in an electric circuit with the contact points of the corresponding device; means for releasing the tokens from all the slots; and means for resetting all the indicators.

3. In means for collecting fares, the combination of a plurality of devices each provided with a slot adapted to receive a metallic fare or token, contact points in each slot against which said fare or token may be held; an indicator corresponding to each of said devices; conductors connecting each indicator in an electric circuit with the contact points of the corresponding device; and a switch arranged in circuit with all of the indicators and adapted to close circuits through them.

4. In means for collecting fares, the combination of a plurality of devices each provided with a slot adapted to receive a metallic fare or token; contact points in each slot against which the fare or token may be held; moving means for each slot for moving said contact points apart; an electrical circuit for actuating each of said moving means; a switch for operating each circuit separately; and a switch for operating all of the circuits together.

5. In means for collecting fares, the combination of a plurality of devices each provided with a slot adapted to receive a metallic fare or token, contact points in each slot against which said fare or token may be held; an indicator corresponding to each of said devices; conductors connecting each indicator in an electric circuit with the contact points of the corresponding device; means for releasing the fare or token from the contact points; a second pair of contacts below the first pair; an indicator in open electric circuit with such second pair of contacts; and a switch for operating said circuit.

6. In means for collecting fares, the combination of a plurality of devices each provided with a slot adapted to receive a metallic fare or token, contact points in each slot against which said fare or token may be held; an indicator corresponding to each of said devices; conductors connecting each indicator in an electric circuit with the contact points of the corresponding device; a plate pivoted at the back of each slot to which one of the contact points is attached; an electro-magnet arranged adjacent to the plate; a lever attached to the plate and forming the armature for the magnet and adapted when turned to rock the plate; and a switch upon the indicator board for closing the circuit through the magnet.

In testimony whereof, I have signed this specification in the presence of two subscribing witnesses.

ARTHUR BROWNING MASTERS.

Witnesses:
ALFRED R. HOLOSHIP,
C. H. STONYER.